US 12,085,280 B2
Sep. 10, 2024

(12) United States Patent
Clark et al.

(54) COMBINED CYCLES

(71) Applicant: ROLLS-ROYCE plc, London (GB)

(72) Inventors: Nathan Clark, Cambridge (GB); Robert J. Miller, Cambridge (GB); Chloe J Palmer, Derby (GB); Jacopo Tacconi, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/176,784

(22) Filed: Mar. 1, 2023

(65) Prior Publication Data
US 2023/0280032 A1    Sep. 7, 2023

(30) Foreign Application Priority Data
Mar. 4, 2022  (GB) .................................... 2203007

(51) Int. Cl.
  *F23R 3/00*  (2006.01)
  *F02C 7/224*  (2006.01)
  *F02C 7/36*  (2006.01)

(52) U.S. Cl.
  CPC .............. *F23R 3/005* (2013.01); *F02C 7/224* (2013.01); *F02C 7/36* (2013.01); *F05D 2260/40311* (2013.01)

(58) Field of Classification Search
  CPC .... F23R 3/005; F02C 7/36; F02C 3/22; F02C 7/143; F02C 7/224; F02C 3/28; F02C 3/04; F05D 2260/40311
  See application file for complete search history.

(56) References Cited

U.S. PATENT DOCUMENTS 11,047,307 B2    6/2021  Roberge
11,745,891 B2 *  9/2023  Rheaume ............... B64D 27/24
                                                    244/135 R
(Continued)

FOREIGN PATENT DOCUMENTS

EP    3623602 A1 *  3/2020  ................ F02C 3/04
EP    3907387 A1    11/2021
(Continued)

OTHER PUBLICATIONS

Great Britain search report dated Aug. 4, 2022, issued in GB Patent Application No. 2203007.6.
(Continued)

*Primary Examiner* — Craig Kim
(74) *Attorney, Agent, or Firm* — Shumaker & Sieffert, P.A.

(57) ABSTRACT

A combined cycle engine is formed of a gas turbine cycle coupled with a fuel expansion cycle in which fuel for the gas turbine cycle is the working fluid of the fuel expansion cycle. The fuel expansion cycle comprises, in flow series, a fuel pump for pumping a cryogenic fuel for the gas turbine cycle, a first heat exchanger for heating the fuel, an expander to recover power by expansion of the fuel and to thereby drive a load, and a second heat exchanger to reheat the fuel. The gas turbine cycle comprises, in flow series, a compressor, a combustor for combustion of reheated fuel delivered from the second heat exchanger, and a turbine configured to drive the compressor. The first heat exchanger and the second heat exchanger are stationed downstream of the combustor and configured to transfer heat from combustion products to the fuel in the fuel expansion cycle.

20 Claims, 8 Drawing Sheets

(56) References Cited

U.S. PATENT DOCUMENTS

| | | | | |
|---|---|---|---|---|
| 11,754,021 B2 * | 9/2023 | Boucher | ............... | F02C 7/36 |
| | | | | 60/266 |
| 2016/0123226 A1 * | 5/2016 | Razak | ............... | F02C 7/18 |
| | | | | 60/39.15 |
| 2021/0207537 A1 * | 7/2021 | Roberge | ............... | F02C 9/30 |
| 2021/0340908 A1 * | 11/2021 | Boucher | ............... | F02C 3/22 |
| 2023/0280032 A1 * | 9/2023 | Clark | ............... | F02C 7/224 |
| | | | | 60/730 |

FOREIGN PATENT DOCUMENTS

| | | | | |
|---|---|---|---|---|
| EP | 4239170 A1 * | 9/2023 | ............... | F02C 3/22 |
| GB | 2531775 A * | 5/2016 | ............... | F02C 3/22 |
| WO | WO-2023027762 A1 * | 3/2023 | | |

OTHER PUBLICATIONS

Extended Search Report from counterpart European Application No. 23155276.1 dated Jul. 12, 2023, 8 pp.

Response to Extended Search Report dated Jul. 12, 2023, from counterpart European Application No. 23155276.1 filed Oct. 11, 2023, 53 pp.

\* cited by examiner

COMBINED CYCLES

CROSS-REFERENCE TO RELATED APPLICATIONS

This specification is based upon and claims the benefit of priority from United Kingdom patent application number GB 2203007.6 filed on Mar. 4, 2022, the entire contents of which is incorporated herein by reference.

BACKGROUND

Technical Field

This disclosure relates to combined cycle engines.

Description of the Related Art

Combined cycle engines have previously been proposed that comprise a gas turbine gas turbine cycle coupled with a fuel expansion cycle that recovers power from the fuel for the gas turbine. Such configurations typically make use of the properties of cryogenic fuels, in which a significant proportion of the exergy used in the liquefaction process may be recovered by an expansion process.

Furthermore, in a typical recuperated gas turbine, the opportunity for heat recovery is limited by the difference between the final nozzle temperature (or an intermediate temperature in the case of an inter-turbine recuperation cycle) and the compressor delivery temperature. In the case of a cryogenic fuel, however, there exists a much larger temperature difference between the final nozzle temperature and the temperature of the fuel, which enables a much more efficient heat recovery process.

SUMMARY

The disclosure is directed towards combined cycle engines formed of a gas turbine cycle coupled with a fuel expansion cycle in which fuel for the gas turbine cycle is the working fluid of the fuel expansion cycle, and aircraft incorporating the same.

In an aspect, there is provided a combined cycle engine of the aforesaid type, in which the fuel expansion cycle comprises, in flow series, a fuel pump for pumping a cryogenic fuel for the gas turbine cycle, a first heat exchanger for heating the fuel, an expander to recover power by expansion of the fuel and to thereby drive a load, and a second heat exchanger to reheat the fuel;
  the gas turbine cycle comprises, in flow series, a compressor, a combustor for combustion of reheated fuel delivered from the second heat exchanger, and a turbine configured to drive the compressor;
  the first heat exchanger and the second heat exchanger are stationed downstream of the combustor and are configured to transfer heat from combustion products of the gas turbine cycle to the fuel in the fuel expansion cycle.

In an embodiment, the fuel is heated to a first temperature in the first heat exchanger.

In an embodiment, the fuel is reheated to a second temperature in the second heat exchanger.

In an embodiment, the first temperature and the second temperature are the same temperature.

In an embodiment, the fuel expansion cycle further comprises a second expander stationed between the second heat exchanger and the combustor of the gas turbine cycle.

In an embodiment, the fuel expansion cycle further comprises a second expander stationed between the second heat exchanger and the combustor of the gas turbine cycle and a third heat exchanger to reheat the fuel stationed between the second expander and the combustor of the gas turbine cycle.

In an embodiment, the first heat exchanger and the second heat exchanger are arranged in parallel between the combustor and an exhaust nozzle of the gas turbine cycle.

In an embodiment, the first heat exchanger and the second heat exchanger are arranged in series between the combustor and an exhaust nozzle of the gas turbine cycle.

In an embodiment, the turbine in the gas turbine cycle is stationed between the combustor and the second heat exchanger.

In an embodiment, the fuel is heated to a first temperature in the first heat exchanger. In an embodiment, the fuel is reheated to a second temperature in the second heat exchanger. In an embodiment, the fuel is reheated to a third temperature in the third heat exchanger.

In an embodiment, the first temperature, the second temperature, and the third temperature are the same temperature.

In an embodiment, the combined cycle engine further comprises a fuel pre-heater stationed between the fuel pump and the first heat exchanger, the fuel pre-heater comprising a burner configured to burn a portion of said fuel to release heat for heating fuel pumped by the fuel pump.

In an embodiment, the fuel pre-heater comprises a fourth heat exchanger configured to heat the fuel to a fourth temperature.

In an embodiment, the combined cycle engine further comprises a control valve to control the quantity of said fuel directed to the burner.

In an embodiment, the combined cycle engine further comprises a controller configured to control the control valve, and thereby control the fourth temperature.

In an embodiment, the controller is configured to vary the fourth temperature given a setpoint for the fourth temperature.

In an embodiment, the setpoint is derived from one or more of:
  an inlet temperature to the hot-side of the first heat exchanger;
  an inlet temperature to the hot-side of the second heat exchanger;
  an outlet temperature of the cold-side of the second heat exchanger.

In an embodiment, the controller is further configured to derive the setpoint for the fourth temperature to meet a target temperature for injection into the combustor.

In an embodiment, the controller is further configured to derive the setpoint for the fourth temperature to prevent icing in the first heat exchanger or the second heat exchanger.

In an embodiment, the load driven by the expander is one or more of:
  the fuel pump;
  an electric machine;
  an air compressor;
  the same load as the gas turbine cycle.

In an embodiment, the turbine in the gas turbine cycle is configured to drive the compressor and one or more further loads selected from:
  the fuel pump;
  an electric machine;
  an air compressor;
  the same load as the expander in the fuel expansion cycle.

In an embodiment, the turbine in the gas turbine cycle is configured to drive a fan or a propeller.

In an embodiment, the turbine in the gas turbine cycle is configured to drive the fan or the propeller via a reduction gearbox.

In an embodiment, the reduction gearbox is an epicyclic reduction gearbox.

In another aspect, there is provided an aircraft comprising the combined cycle engine.

DESCRIPTION OF THE DRAWINGS

Embodiments will now be described by way of example only with reference to the accompanying drawings, which are purely schematic and not to scale, and in which.

DETAILED DESCRIPTION

Figure 1:
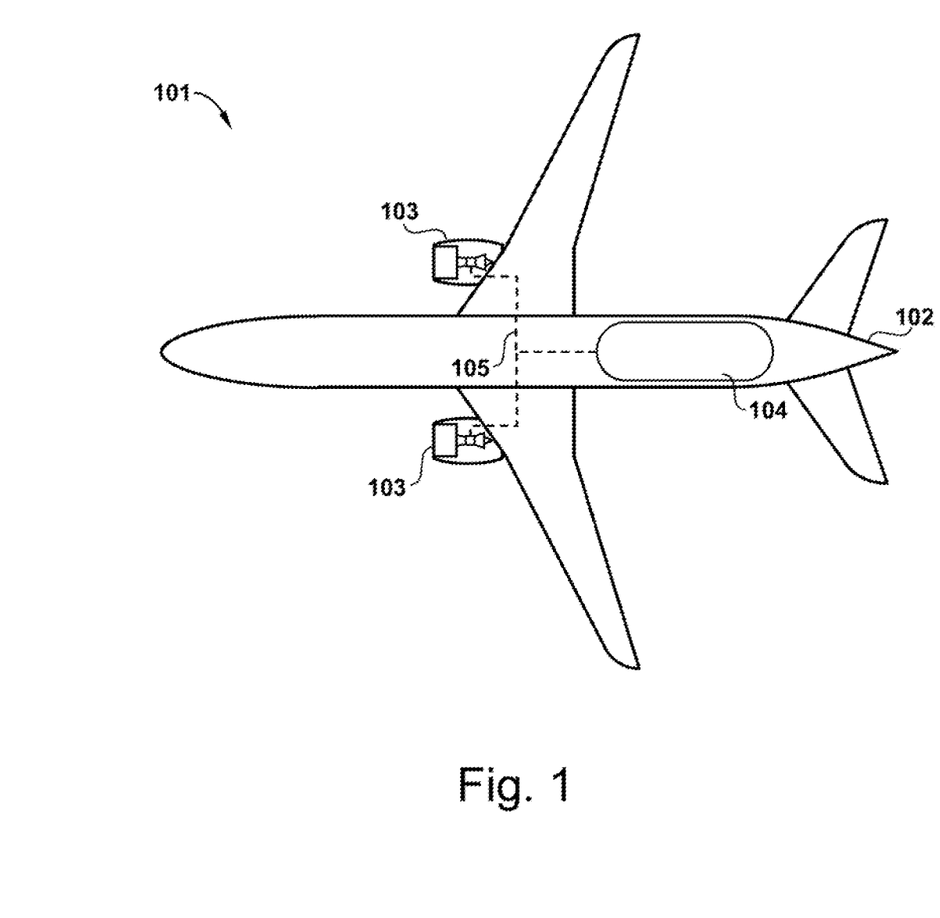
FIG. 1 shows an airliner comprising a cryogenic fuel storage system and combined cycle engines.

FIG. 1

A cryogenically-fueled airliner is illustrated in FIG. 1. In this example, the airliner 101 is of substantially conventional tube-and-wing twinjet configuration with a central fuselage 102 and substantially identical engines 103 which are mounted in an underwing configuration.

A cryogenic fuel storage system 104 is located in the fuselage 102 and is connected with the engines 103 via a fuel delivery system 105. In an embodiment, the cryogenic fuel is stored at or below its boiling point.

In the present embodiment, the cryogenic fuel is hydrogen stored at or below its boiling point. In a specific embodiment, the cryogenic fuel storage system 104 is configured to store the hydrogen fuel at 20 kelvin. In the present embodiment, the hydrogen fuel is pressurised to a pressure from 1 to 3 bar, and in a specific example, 2 bar. It will be appreciated that the principles of the present disclosure may be extended to other cryogenic fuels, such as liquid natural gas.

Figure 2:
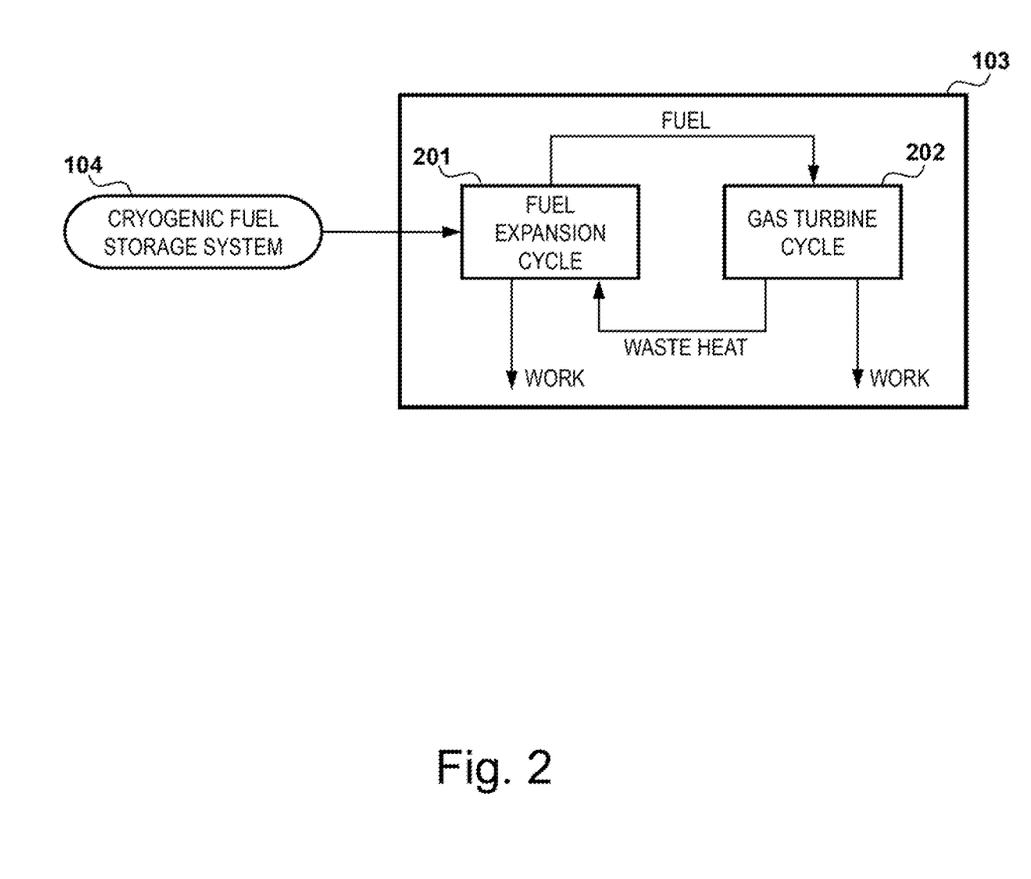
FIG. 2 shows the cryogenic fuel storage system and the fuel expansion cycle and gas turbine cycle forming the combined cycle engine of FIG. 1.

FIG. 2

In the present embodiment, the engines 103 are combined-cycle engines formed of a gas turbine cycle coupled with a fuel expansion cycle, in which the fuel for the gas turbine cycle is the working fluid of the fuel expansion cycle. A block diagram of this configuration is shown in FIG. 2, which only shows one of the engines 103 for clarity.

Fuel is obtained from the cryogenic fuel storage system 104 via the fuel delivery system 105, and is first supplied to a fuel expansion cycle 201 in which it is heated and expanded to develop work, whereafter the fuel is supplied to a gas turbine cycle 202 in which it is combusted and expanded to develop work. In the combined cycle shown in FIG. 2, waste heat from the gas turbine cycle 202 is transferred to the fuel expansion cycle 201.

Figure 3:
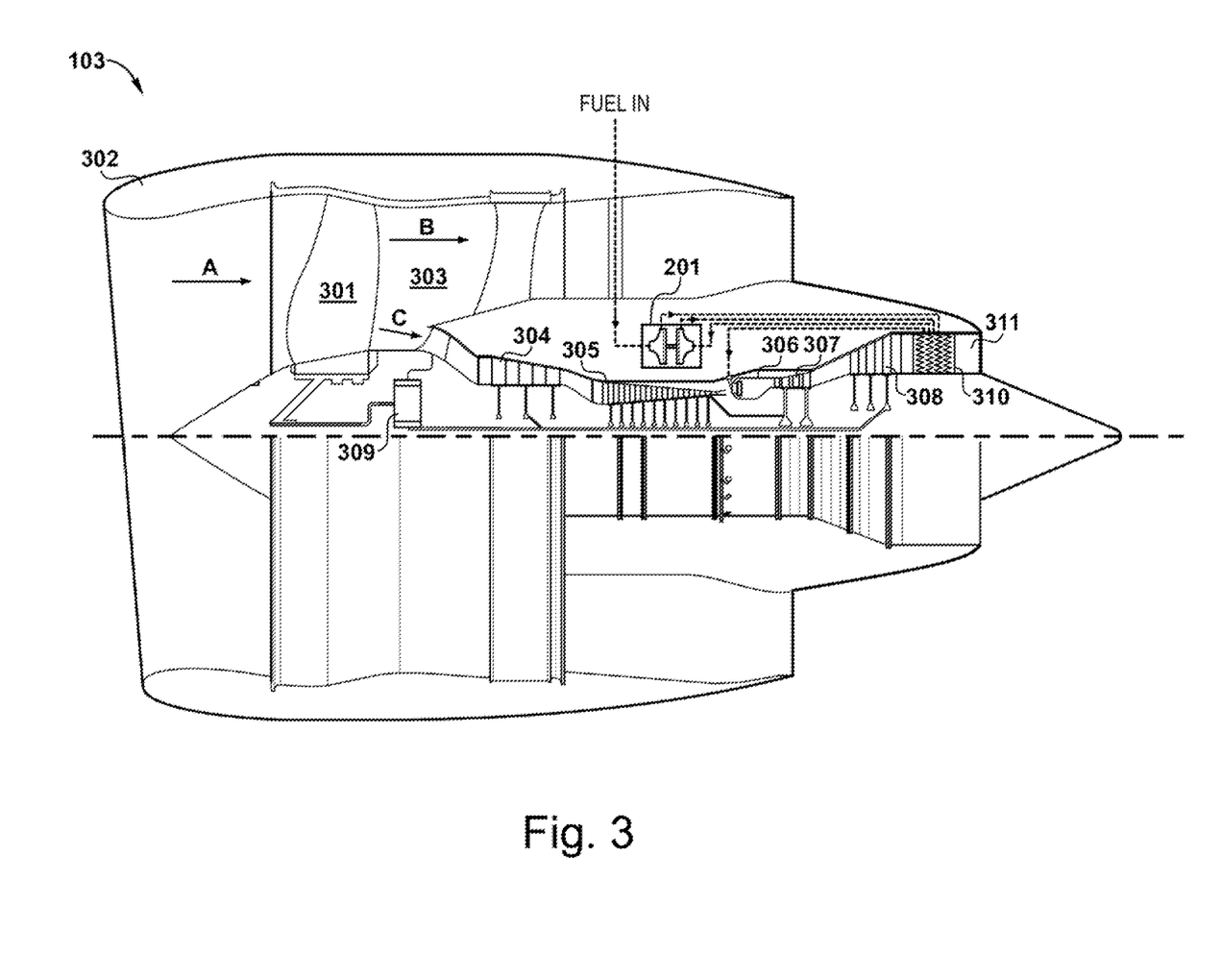
FIG. 3 shows the combined cycle engine.

FIG. 3

A general arrangement of one of the engines 103 is shown in FIG. 3.

As described previously, the engine 103 is a combined cycle engine comprising a fuel expansion cycle 201 coupled with a gas turbine cycle 202. In the present embodiment, the engine 103 is a turbofan comprising a ducted fan 301 located in a nacelle 302. The fan 301 receives intake air A and generates two airflows: a bypass flow B which passes axially through a bypass duct 303 and a core flow C which enters the gas turbine cycle 202.

The gas turbine cycle 202 comprises, in axial flow series, a low-pressure compressor 304, a high-pressure compressor 305, a combustor 306, a high-pressure turbine 307, and a low-pressure turbine 308.

In operation, the core flow C is compressed by the low-pressure compressor 304 and is then directed into the high-pressure compressor 305 where further compression takes place. The compressed air exhausted from the high-pressure compressor 305 is directed into the combustor 306 where it is mixed with fuel and the mixture is combusted.

Following combustion, the resultant hot combustion products are discharged from the combustor 306 and expand through, and thereby drive, the high-pressure turbine 307 and in turn the low-pressure turbine 308.

The fan 301 is driven by the low-pressure turbine 308 via a reduction gearbox 309. In the present embodiment, the reduction gearbox 309 takes the form of an epicyclic gearbox. In this specific embodiment, the reduction gearbox 309 is a planetary-type epicyclic gearbox and thus comprises a sun gear meshed with a plurality of planet gears located in a rotating carrier. In this example, five planet gears are provided. The planet gears are also meshed with a static ring gear. The rotating carrier is connected with the fan 301. It will be appreciated that a star-type epicyclic gearbox could be used instead, with the planet gear carrier being static and the ring gear allowed to rotate to drive the fan 301. In other embodiments, the gearbox 309 could be a layshaft-type gearbox or any other type of reduction gear. In further alternatives, the gearbox may be omitted and the engine 103 configured as a direct-drive engine, either in a two-spool or three-spool arrangement.

After passing through the low-pressure turbine 308, the combustion products from the gas turbine cycle 202 still retain a considerable amount of enthalpy. In the present embodiment, a heat exchanger system 310 is located in the gas path downstream of the low-pressure turbine 308 to facilitate transfer of waste heat from the combustion products into the fuel. In order to recover energy, the fuel expansion cycle 201 first operates to pressurise fuel delivered by the fuel delivery system 105, and then direct the pressurised fuel to the heat exchanger system 310 to add heat. The heated fuel is then passed through an expander to recover energy, reducing the absolute pressure and temperature of the fuel. In the present embodiment, this expanded fuel is not immediately directed to the combustor 306 in the gas turbine cycle 202, but is instead directed back to the heat exchanger system 310 to add heat prior to combustion in the gas turbine cycle 202, reducing fuel consumption.

Cooled combustion products exiting the heat exchange system 310 are exhausted to atmosphere via a core nozzle 311.

It will be appreciated of course that the engines 103 could also be configured as turboshaft or turboprop engine, or an open fan engine or a propfan engine. In yet other alternative configurations, the engines could be used in a land- or sea-based installation, for example in a power plant or in a ship.

Figure 4A:
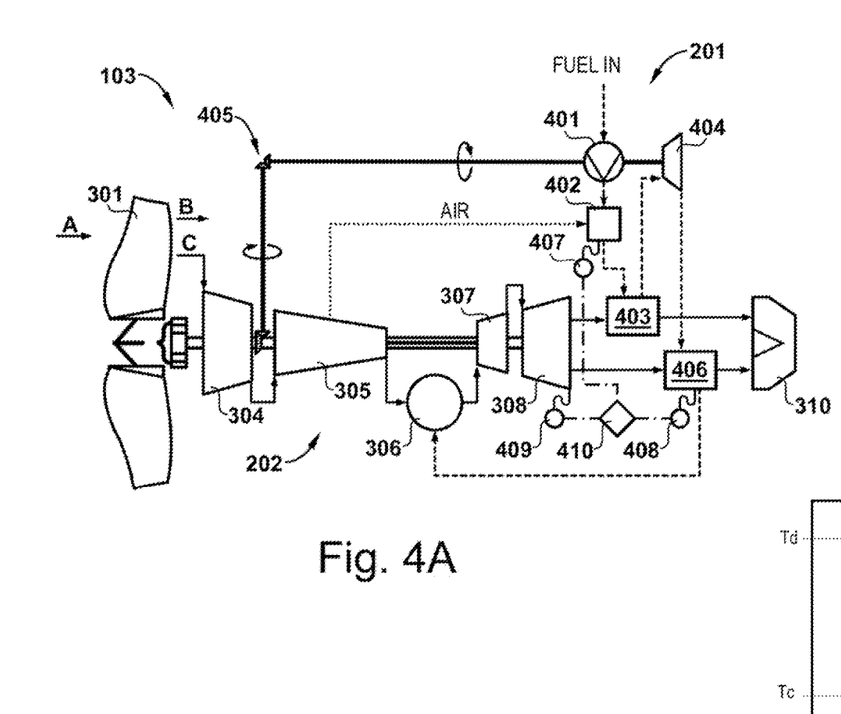
FIG. 4A shows the combined cycle engine including the heat exchanger system.
Figure 4B:
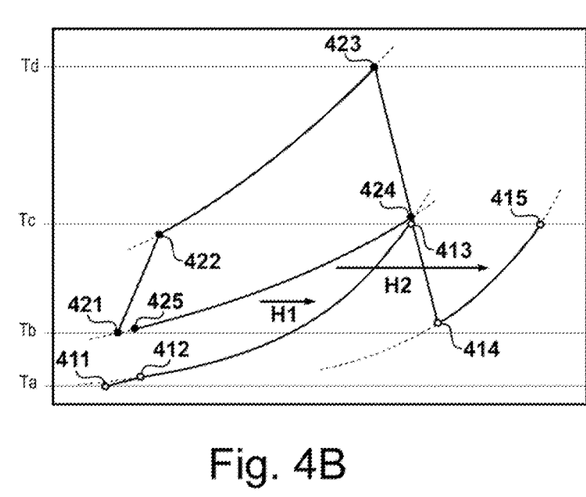
FIG. 4B shows a temperature-entropy diagram of the engine of FIG. 4A.

FIGS. 4A & 4B

A schematic representation of the engine 103 is shown in FIG. 4A, along with a corresponding temperature-entropy (T-s) diagram in FIG. 4B.

In this embodiment, fuel is delivered from the cryogenic storage system 104 by the fuel delivery system 105 and is pressurised by a pump 401 to pressurise the fuel above its delivery pressure. In the present embodiment, the pump 401 is a centrifugal pump but in alternative embodiments may be a reciprocating piston pump, for example a two-stage single piston pump, or any other suitable pump for the particular cryogenic fuel in use.

Pressurised fuel is then conveyed into a pre-heater 402. In this embodiment, the pre-heater 402 is configured to raise the temperature of the fuel to a controllable temperature. This is achieved by combustion of a portion of the overall fuel supplied to the engine 103. Pressurised air for the pre-heater combustion process may be bled from the gas turbine cycle 202, for example from the high-pressure compressor 305 as shown in the FIG., or alternatively from the low-pressure compressor 304 or any other suitable source, for example a ground cart during engine start or an auxiliary power unit (APU) on the airliner 101. The pre-heater 402 may assist operability at various points in the operational envelope of the engine 103. For example, cold start or in-flight relight may be assisted by use of the pre-heater 402 as little waste heat from the gas turbine cycle 202 may be available. It will be appreciated that the pre-heater 402 may be run at any suitable point in the operational envelope. An exemplary arrangement for the pre-heater 402 will be described further with reference to FIG. 5.

Pre-heated fuel is then conveyed into a cold-side pass of a first heat exchanger 403, which forms part of the heat exchanger system 310 (FIG. 3). Combustion products exiting the low-pressure turbine 308 are directed via a hot-side pass of the first heat exchanger 403. In this way, waste heat from the gas turbine cycle 202 is transferred into the fuel working fluid of the fuel expansion cycle 201.

Pressurised and heated fuel is then directed to an expander 404 through which the fuel expands and develops work. In this example, the expander 404 is a rotary machine and is configured to drive a load. In the present embodiment, the load comprises the pump 401. In a specific embodiment, the expander 404 is an axial turbine. In another embodiment, it could instead be a centrifugal turbine. The expander 404 may be single- or multi-stage in dependence upon, for example, a selected stage-loading or other design requirement.

In the embodiment of FIG. 4, a significant amount of work is developed by the expander 404 over and above the power consumption of the pump 401. The expander 404 is therefore also configured to drive the low-pressure spool of the gas turbine cycle 202 via a tower-shaft arrangement 405. In this way, the fuel expansion cycle 201 drives the same load as the gas turbine cycle 202. In this embodiment of course, the load is the fan 201, but it will be appreciated that in alternative implementations the load could be different, for example the load could be a generator in an electrical generation installation. It will be appreciated that in other embodiments, the expander 404 could be configured to drive an additional or even a separate load to the gas turbine cycle 201. Other loads could comprise an electrical generator which generates electrical power for use elsewhere in the engine 103 or on the airliner 101. Alternatively, the expander 404 could be configured to drive an air compressor for delivery of compressed air elsewhere on the engine 103 or on the airliner 101, for example to the pre-heater 402, the gas turbine cycle 202, or as heated air for anti-ice systems or for cabin air, etc.

Following expansion of the fuel in the expander 404, the fuel is reheated in the cold-side pass of a second heat exchanger 406 which forms part of the heat exchanger system 310 (FIG. 3). As with the first heat exchanger 403, combustion products exiting the low-pressure turbine 308 are directed via a hot-side pass of the second heat exchanger 406. In this way, waste heat from the gas turbine cycle 202 is transferred into the fuel, which then proceeds to the combustor 306 for combustion in the gas turbine cycle 202.

In the present embodiment, the temperature of the fuel is sensed at the outlet of the pre-heater 402 by a first fuel temperature sensor 407, and again at the outlet of the second heat exchanger 406 by a second fuel temperature sensor 408. In addition, in this specific embodiment the inlet temperature to the hot-sides of the first heat exchanger 403 and the second heat exchanger 406 are measured by an exhaust gas temperature sensor 409. The temperature sensors 407-409 supply temperature data to a controller 410 for the pre-heater 402. The control scheme will be described further with reference to FIGS. 5A and 5B. In the present embodiment, the controller 410 is integrated with the electronic engine controller (not shown) for the whole engine 103. In a specific embodiment the electronic engine controller may be a full-authority digital engine control (FADEC). In alternative embodiments, the controller 410 may be a separate controller to the electronic engine controller.

In the present embodiment, the heat exchangers 403 and 406 are counter-cross flow tubular heat exchangers, but it is envisaged that other heat exchanger types such as spiral-wound tubular could be used. An example configuration of the heat exchangers will be described further with reference to FIG. 5A.

After passing through the heat exchangers 403 and 406, the exhaust combustion products are directed through the core nozzle 311.

The T-s diagram of FIG. 4B identifies the various stages of compression, heat addition, expansion and heat rejection in both the fuel expansion cycle 201 defined by conditions [411,412,413,414,415] and gas turbine cycle 202 defined by conditions [421,422,423,424,425]. It should be noted that the T-s diagram combines both the fuel expansion cycle, in which the working fluid is the fuel, and the gas turbine cycle, in which the working fluid is air and combustion products, and hence lines of constant pressure for the two working fluids cross close to conditions 413 and 424.

The fuel begins at an initial temperature Ta at condition 411 and is pressurised by the pump 401 (and optionally heated by the pre-heater 402) until it reaches condition 412. It is then heated via transfer of heat H1 in the cold-side of the first heat exchanger 403 until it reaches temperature Tc at condition 413, whilst the combustion products cool in hot-side of the heat exchanger 403. Thus, in terms of temperature, condition 413 of the fuel expansion cycle 201 corresponds closely to the inlet conditions 414 of the hot-side of the first heat exchanger 403 in the gas turbine cycle 202.

The fuel is then expanded in the expander 404, reducing its temperature and pressure to condition 414 and developing work.

The fuel is then reheated back to temperature Tc at condition 415 in the cold-side of the second heat exchanger 406 via transfer of heat H2 from the combustion products in the hot-side of the second heat exchanger 406.

In the gas turbine cycle 202, inlet air A is compressed which raises its temperature from a flight inlet temperature Tb at condition 421 up to a combustor inlet temperature at condition 422. It will be seen that in the present embodiment, the combustor inlet temperature is lower that the reheated fuel temperature Tc. Thus the reheat stage [414, 415] increases the efficiency of the gas turbine cycle 202, reducing overall fuel consumption as waste heat has been used to heat the fuel for a given turbine entry temperature Td, rather than combustion of fuel itself.

It has been found that by reducing the overall pressure ratio (OPR) of the gas turbine cycle 202 below its simple-cycle optimum increases the pressure drop over the expander 404 and hence the specific work output of the fuel expansion cycle 201. This is because the lower OPR reduces the combustor pressure but retains a fixed maximum fuel pressure. Additionally, for a fixed turbine entry temperature, the reduced OPR of the gas turbine cycle 202 increases the turbine exit temperature, resulting in higher enthalpy remaining in the exhaust combustion products. Consequently, the fuel may be heated to a higher maximum temperature Tc in the heat exchanger system 310, which in turn increases work developed by the expander 404. This effect is more pronounced the higher the turbine entry temperature and the higher the polytropic efficiencies of the turbomachinery in the engine 103.

Further, it has been found that the combined cycle configuration of the engine 103 is particularly beneficial in an aero engine application due to the large variation of inlet conditions across the flight envelope. In particular, analysis has shown that the specific work output of the fuel expansion cycle 201 increases with altitude. This is because the expander 404 operates between a fixed maximum fuel pressure and a variable combustor pressure. As altitude increases, inlet pressure decreases, and hence so too does the combustor pressure. This increases the pressure drop across the expander 404 and the specific work associated therewith. Thus, the increase in specific work in the fuel expansion cycle 201 runs opposite to the typical decrease in specific work across the turbines in the gas turbine cycle 202 caused by altitude. This enables a reduction in the top-of-climb maximum power required from the gas turbine cycle 202. By relaxing the maximum power requirement, fuel consumption is reduced at part-throttle conditions such as during cruise and descent.

Figure 5A:
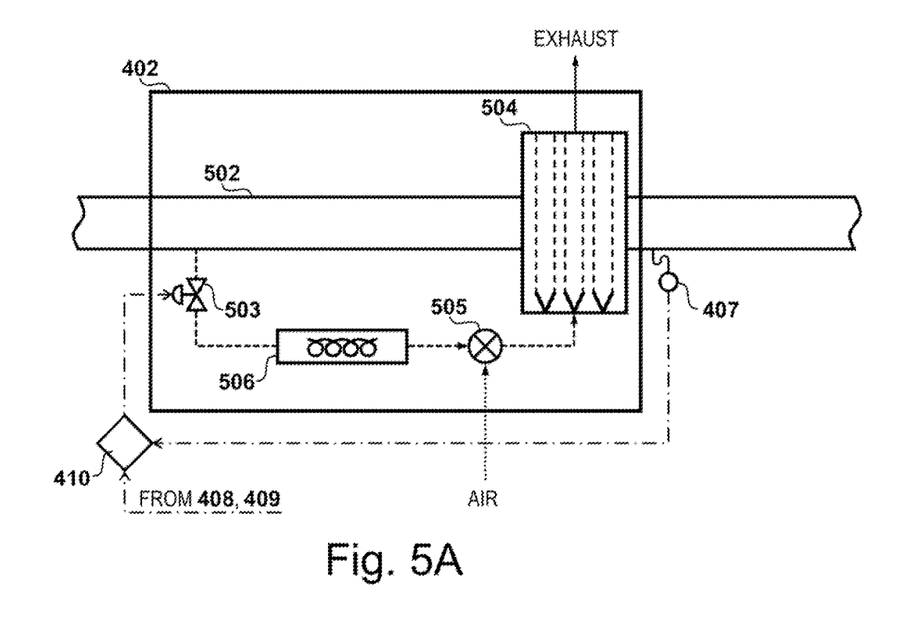
FIG. 5A shows a pre-heater which forms part of the combined cycle engine of FIG. 4A.
Figure 5B:
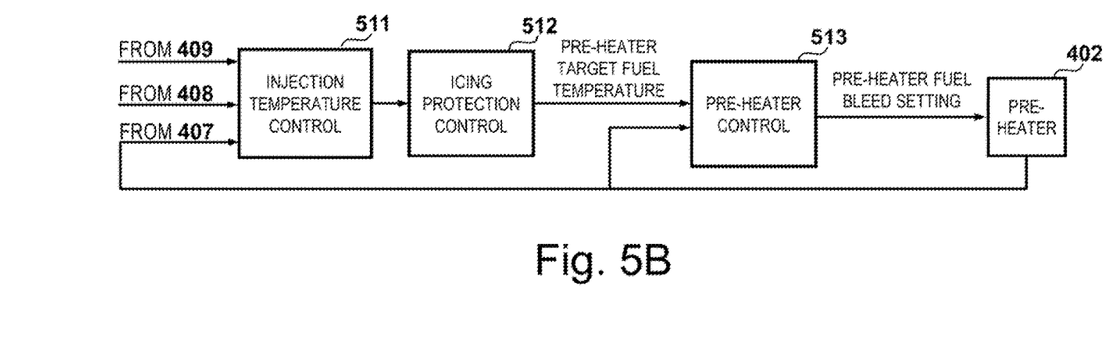
FIG. 5B shows a control scheme for the pre-heater of FIG. 5A.

FIGS. 5A & 5B

An example configuration of the pre-heater 402 is shown in FIG. 5A.

The pre-heater 402 comprises an offtake 501 to divert a portion of the fuel from a main fuel conduit 502. The amount of fuel bled from the main fuel conduit 502 is controlled by a control valve 503. In the present embodiment, the control valve 503 is controlled by the controller 410. As will be described further with reference to FIG. 5B, the controller 408 responds to signals received from the temperature sensors 407-409 and in turn controls the control valve 503 to vary the bleed fuel flow rate. In operation, of the order of 1 percent of the fuel flow through the main fuel conduit 502 is bled for use in the pre-heater 402.

As described previously, in the present embodiment the fuel is hydrogen. Hydrogen has very high specific and latent heat capacities, however as a gas it has a very low molecular weight and density, and thus it can be challenging to exchange heat in a compact way. Thus the pre-heater 402 heats the hydrogen fuel in the main fuel conduit 502 by combustion of bled fuel in a burner 504 located in heat exchange relationship with the main fuel conduit 502.

In the present embodiment, the burner 504 is concentric around the main fuel conduit 502 and hence the burner 504 itself comprises the heat exchanger for transferring heat to hydrogen fuel in the main fuel conduit 502. In this configuration, therefore the heat exchanger function is provided by the main fuel conduit 502 acting as a first pass of the heat exchanger, and the burner 504 around the main fuel conduit 502 acting as the second pass of the heat exchanger, with heat transferring from the second pass to the first pass so as to vaporise the hydrogen fuel therein.

It will of course be appreciated that other arrangements are possible. For example, the burner 504 could be positioned separately from the main fuel conduit 502 and exhaust gases therefrom directed through a dedicated heat exchanger unit. Such a unit may comprise a first pass for the flow of hot exhaust products from the burner 504, and a second pass for the main fuel flow which is then heated as it flows through the heat exchanger unit. In such an example, the first pass may comprise a plurality of fuel passages for fuel received from the main fuel conduit 502. The second pass may comprise a plurality of exhaust passages for exhaust received from the burner 504. During operation, heat is transferred from the second pass to the first pass so as to heat the hydrogen fuel therein.

In the present embodiment, air for combustion with the bled fuel is bled from the high-pressure compressor 304. Alternatively, it may be bled from the low-pressure compressor 302. It will be appreciated that the air for combustion could be obtained from any other suitable location, for example a dedicated air compressor driven by the expander 404, as described previously.

In the present example, the air and the bled hydrogen fuel are mixed in a pre-mixer 505 prior to supply to the burner 504, although in alternative embodiments it may be directly co-injected into the burner with the fuel instead. Combustion products from the burner 504 are, in an embodiment, exhausted into the bypass duct 303 of the engine 103. Alternatively, they may be exhausted outside the nacelle 302.

It should be understood that, in the present example, the products of combustion exhausted from the burner 504 are not mixed with the fuel in the main fuel conduit 502. In this respect, the pre-heater 402 therefore differs from a pre-burner system as used in staged combustion cycle rocket engines.

In steady state, there is enough heat emanating from the burner 504 to ensure vaporisation of the small amount of bled fuel. At engine start or other cold conditions for example, the pre-heater 402 comprises a warmer 506 to ensure that the bled fuel is hot enough to mix with air in the pre-mixer 505. In a specific embodiment, the warmer 506 comprises an electric heating element, for example an inductive coil. Alternatively, the warmer 506 could be simply configured as a boil volume, in which the ambient conditions therein contain sufficient enthalpy to boil the initial flow of bled fuel prior to delivery to the pre-mixer 505 and the burner 504.

An example control scheme for the controller 410 is shown in FIG. 5B. Temperature data is received from the first fuel temperature sensor 407, the second fuel temperature sensor 408, and the exhaust gas temperature sensor 409. These data are processed in an injection temperature control loop 511 which derives a pre-heater target fuel temperature subject to a limiter 512 which implements icing protection control.

In the present embodiment, the injection temperature control loop 511 is configured to determine the required pre-heater fuel outlet temperature given the temperature data from the second fuel temperature sensor 408 and the operating point of the gas turbine cycle 202. In the present embodiment, the limiter 512 ensures that the target pre-heater fuel outlet temperature will not cause icing in the heat exchanger system 310. This is achieved by comparing the data from the exhaust gas temperature sensor 409 to the data from the first fuel temperature sensor 407 to produce a corrected pre-heater fuel outlet temperature if necessary. This is because it is possible for the temperature drop across the heat exchanger system 310 to be sufficient for ice to accumulate in the hot-side of the heat exchangers.

In the present embodiment, the pre-heater fuel outlet temperature is then provided to a pre-heater control loop 513, which compares the pre-heater fuel outlet temperature setpoint to the current pre-heater outlet temperature data from the first temperature sensor 407. The control loop 513 uses this comparison to produce a pre-heater fuel bleed setting to control the control valve 503. In an embodiment, the pre-heater control loop 513 is a proportional-integral-derivative (PID) controller and so produces the pre-heater fuel bleed setting following proportional, integral, and derivative operations on the error signal derived from the difference between the temperature setpoint and current temperature. It will be appreciated that other types of control loops could be used, for example proportional-integral or model-based control.

The controller 410 therefore acts to ensure that the pre-heater 402 provides the correct heat input to the fuel during both steady-state operation and during transient manoeuvres. For example, during cruise it may be determined that sufficient exhaust gas temperature is available and the control valve 503 may be fully closed. During descent, with the engine at flight idle, the exhaust gas temperature may drop and so controller may increase the bleed flow rate of the control valve 503 by operation of the limiter 512.

Further, during a slam accel, the exhaust gas temperature may initially be relatively low whilst the fuel flow rate may be particularly high during the manoeuvre. In such circumstances, the injection temperature control loop 511 will cause an increase in the pre-heater fuel outlet temperature setpoint. It will be appreciated that in the present embodiment, the additional enthalpy added to the fuel by the pre-heater 402 will increase the power output of the expander 404 during the manoeuvre which in turn will help overcome the inertia of the low-pressure spool in the gas turbine cycle 202, improving engine response.

Figure 6:
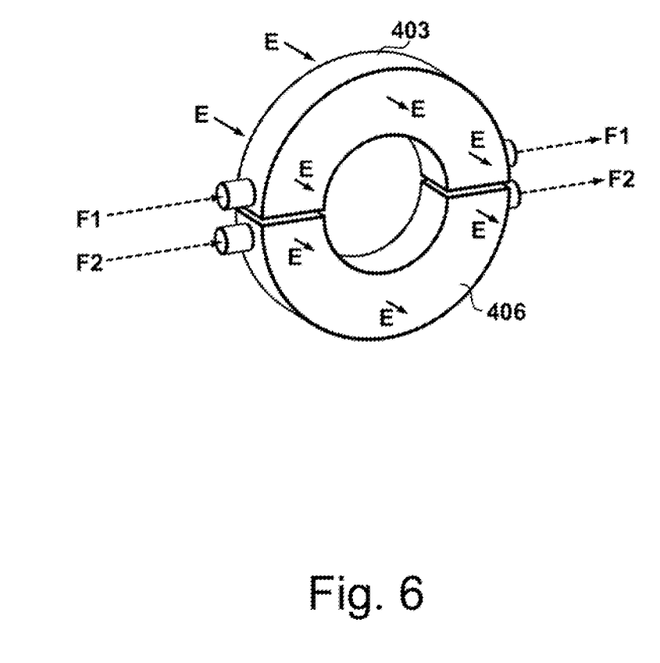
FIG. 6 shows the heat exchanger system of the combined cycle engine of FIG. 4A.

FIG. 6

An exemplary configuration for the heat exchanger system 310 is shown in FIG. 6. It will be appreciated that supplying the hot-side of the second heat exchanger 406 with combustion products from the low-pressure turbine 308 will maximise the temperature at the end of the fuel expansion cycle (condition 415). By the same token, the supplying the hot-side of the second heat exchanger 406 with combustion products from the low-pressure turbine 308 will maximise the work developed by the expander 404. Thus in the present embodiment the heat exchangers 403 and 406 are configured to be arranged in parallel, which is to say they receive exhaust combustion products E in the hot-side passes at the same temperature, with fuel F1 flowing between the pump 401 and the expander 404 being heated in the first heat exchanger 403 and fuel F2 flowing between the expander 404 and the combustor 306 being heated in the second heat exchanger 406.

In the embodiment shown in FIG. 6, each heat exchanger 403, 406 each comprises a half annulus. It will be appreciated that in other embodiments, each heat exchanger 403, 406 may each comprise a plurality of heat exchanger units connected via appropriate manifolds. The heat exchangers could be arranged around the exhaust annulus in any suitable arrangement, for example alternating or otherwise.

It will be appreciated that in alternative embodiments, the first heat exchanger 403 and the second heat exchanger 406 may be arranged in series. This may increase the total temperature drop across the heat exchanger system 310. In such a configuration, a choice may be made to heat the fuel in each heat exchanger to substantially the same temperature Tc, which would be limited by the temperature of the exhaust combustion products in the second heat exchanger in the series, or instead to allow the temperatures at conditions 413 and 415 be different.

Furthermore, in other applications such as in land-based industrial engines, the heat exchangers could take any other form as the exhaust from the gas turbine cycle 202 may be gathered in a collector rather than being directed out via nozzle 310.

Figure 7A:
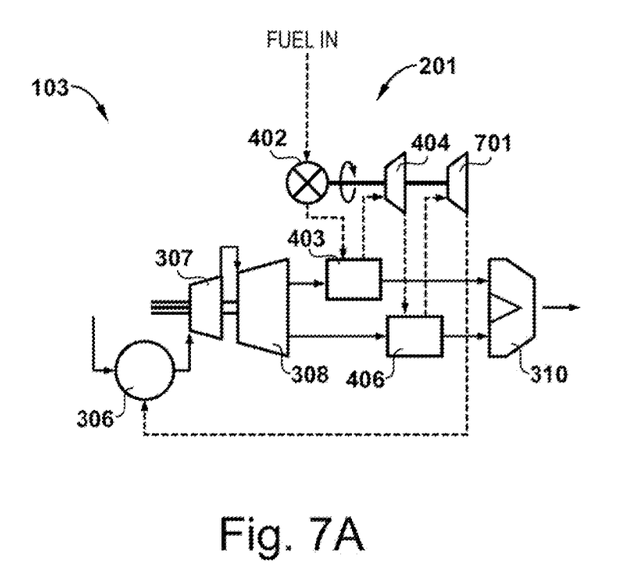
FIG. 7A shows the combined cycle engine including a second expander.
Figure 7B:
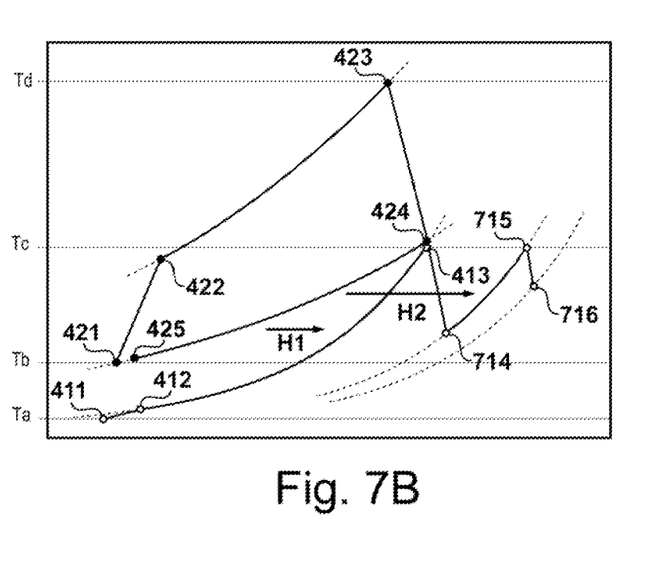
FIG. 7B shows a temperature-entropy diagram of the engine of FIG. 7A.

FIGS. 7A & 7B

A schematic representation of the engine 103 comprising an additional expander is shown in FIG. 7A, along with a corresponding T-s diagram in FIG. 7B.

In FIG. 7A, the cold end of the engine 103 and the pre-heater 402 have been omitted for clarity. In this embodiment the fuel expansion cycle 201 further comprises a second expander 701 to receive the reheated fuel from the second heat exchanger 406 and expand it prior to supply to the combustor 306. The second expander 701 may be of similar configuration to the expander 404, and may hence be either an axial turbine or a centrifugal turbine, for example. It may be single- or multi-stage, possibly depending on a selected maximum stage loading, for example, or any other design requirement.

In the present embodiment, the second expander 701 is configured to drive the same load as the expander 404, but it will be appreciated that it could drive a different load.

As shown in the T-s diagram of FIG. 7B, the overall pressure ratio of the fuel expansion cycle 201 in this embodiment is the same as the embodiment described with reference to FIG. 4B, in that the delivery pressure of the fuel is the same at condition 716 as it is at condition 415. However, it will be seen that the temperature is slightly less due to the two expansions, the first expansion [413, 714] being across the expander 404 and the second expansion [715,716] being across the second expander 701.

It is envisaged that in alternative embodiments, additional reheat and expansion stages could be included.

In this embodiment, the pressure ratio of the second expansion [715,716] is less than the pressure ratio of the expansion [413, 714]. In a conventional reheated cycle, the optimal pressure ratio split for n reheated turbines is the nth root of the total available pressure ratio over the whole turbine system. However, in the combined cycle configuration of the engine 103, it has been determined that efficiency is maximised with a lower pressure ratio over the final expander compared to those preceding it in the fuel expansion cycle 201. This reduces the drop in fuel temperature across the final expander and hence delivers fuel to the gas turbine cycle 202 at a higher temperature, reducing fuel consumption and thus improving overall combined cycle efficiency.

Figure 8A:
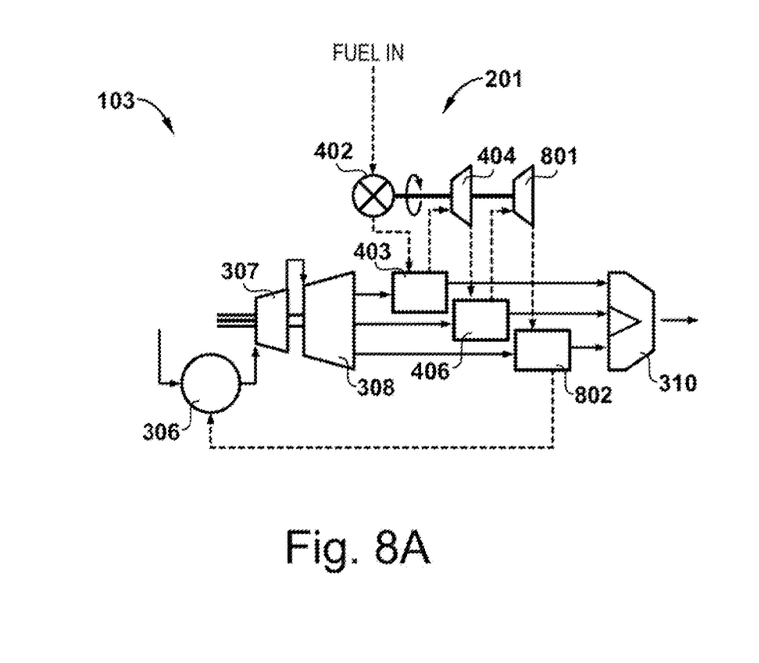
FIG. 8A shows the combined cycle engine including a second expander and a third heat exchanger.
Figure 8B:
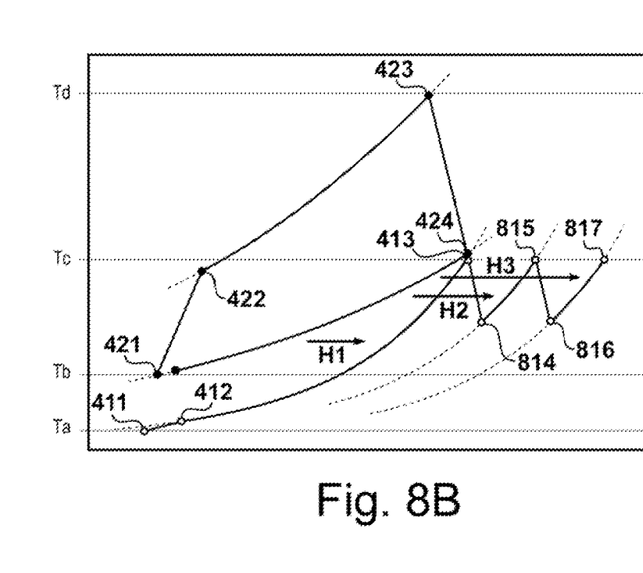
FIG. 8B shows a temperature-entropy diagram of the engine of FIG. 8A.

FIGS. 8A & 8B

A schematic representation of the engine 103 comprising an additional expander and an additional heat exchanger is shown in FIG. 8A, along with a corresponding T-s diagram in FIG. 8B.

In FIG. 8A, the cold end of the engine 103 and the pre-heater 402 have been omitted for clarity. This embodiment builds upon the embodiment of FIG. 7A in that it further comprises both a second expander 801 and a third heat exchanger 802. Thus, as with the embodiment of FIG. 7A, the second expander 801 receives reheated fuel from the second heat exchanger 406 and expands it.

The second expander 701 may be of similar configuration to the expander 404, and may hence be either an axial turbine or a centrifugal turbine, for example. It may be single- or multi-stage, possibly depending on a selected maximum stage loading, for example, or any other design requirement. In the present embodiment, the second expander 801 is configured to drive the same load as the expander 404, but it will be appreciated that it could drive a different load.

Following expansion in the second expander 701, the fuel flows through a cold-side pass of the third heat exchanger 802, being heated by combustion products flowing through a hot-side pass thereof. Following this second reheat stage, the fuel is injected into the combustor 306 for combustion in the gas turbine cycle 202.

In the present embodiment, the second expander 801 is configured to drive the same load as the expander 404, but it will be appreciated that it could drive a different load.

As shown in the T-s diagram of FIG. 8B, the overall pressure ratio of the fuel expansion cycle 201 in this embodiment is the same as the embodiment described with reference to FIGS. 4B and 7B, whereby the fuel delivery pressure at condition 817 is the same as condition 415. Due to the second reheat stage [815,816] in the third heat exchanger 406 adding heat H3, the fuel delivery temperature at condition 616 is temperature Tc and hence the efficiency of the gas turbine cycle 202 is improved.

In this embodiment is will be noted that due to the second reheat stage [814,816] it is possible to set the pressure ratio of the expanders 404 and 801 to be both equal to the square root of the total expansion ratio of the fuel expansion cycle 201. In general terms, in this embodiment n expansion-and-reheat stages may be included, in which the pressure ratio of each expander is equal to the nth root of the total expansion ratio.

The two expansion stages [413,814] and [815,816] with the reheat stage [814,815] results in the fuel expansion cycle 201 delivering a larger power output for a given overall pressure ratio and maximum cycle temperature.

The invention claimed is:

1. A combined cycle engine formed of a gas turbine cycle coupled with a fuel expansion cycle in which fuel for the gas turbine cycle is the working fluid of the fuel expansion cycle, wherein:

the fuel expansion cycle comprises, in flow series, a fuel pump for pumping a cryogenic fuel for the gas turbine cycle, a first heat exchanger for heating the fuel, an expander to recover power by expansion of the fuel and to thereby drive a load, and a second heat exchanger to reheat the fuel;

the gas turbine cycle comprises, in flow series, a compressor, a combustor for combustion of reheated fuel delivered from the second heat exchanger, and a turbine configured to drive the compressor;

the first heat exchanger and the second heat exchanger are stationed downstream of the combustor and are configured to transfer heat from combustion products of the gas turbine cycle to the fuel in the fuel expansion cycle; and the first heat exchanger and the second heat exchanger are arranged in parallel between the combustor and an exhaust nozzle of the gas turbine cycle.

2. The combined cycle engine of claim 1, wherein:
the fuel is heated to a first temperature in the first heat exchanger; and
the fuel is reheated to a second temperature in the second heat exchanger.

3. The combined cycle engine of claim 2, in which the first temperature and the second temperature are the same temperature.

4. The combined cycle engine of claim 1, in which the fuel expansion cycle further comprises a second expander stationed between the second heat exchanger and the combustor of the gas turbine cycle.

5. The combined cycle engine of claim 1, in which the fuel expansion cycle further comprises a second expander stationed between the second heat exchanger and the combustor of the gas turbine cycle and a third heat exchanger to reheat the fuel stationed between the second expander and the combustor of the gas turbine cycle.

6. The combined cycle engine of claim 1, in which the turbine in the gas turbine cycle is stationed between the combustor and the second heat exchanger.

7. The combined cycle engine of claim 5, wherein:
the fuel is heated to a first temperature in the first heat exchanger;
the fuel is reheated to a second temperature in the second heat exchanger; and
the fuel is reheated to a third temperature in the third heat exchanger.

8. The combined cycle engine of claim 7, in which the first temperature, the second temperature, and the third temperature are the same temperature.

9. The combined cycle engine of claim 1, further comprising a fuel pre-heater stationed between the fuel pump and the first heat exchanger, the fuel pre-heater comprising a burner configured to burn a quantity of said fuel to release heat for heating fuel pumped by the fuel pump.

10. The combined cycle engine of claim 9, in which the fuel pre-heater comprises a fourth heat exchanger configured to heat the fuel to a fourth temperature.

11. The combined cycle engine of claim 10, further comprising:
a control valve to control the quantity of said fuel directed to the burner; and
a controller configured to control the control valve, and thereby control the fourth temperature.

12. The combined cycle engine of claim 11, in which the controller is configured to vary the fourth temperature given a setpoint for the fourth temperature derived from one or more of:
an inlet temperature to a hot-side of the first heat exchanger;

an inlet temperature to a hot-side of the second heat exchanger; and an outlet temperature of a cold-side of the second heat exchanger.

13. The combined cycle engine of claim 12, in which the controller is further configured to derive the setpoint for the fourth temperature to meet a target temperature for injection into the combustor and/or to prevent icing in the first heat exchanger or the second heat exchanger.

14. The combined cycle engine of claim 1, in which the load driven by the expander is one or more of:
the fuel pump;
an electric machine;
an air compressor; and
the same load as the gas turbine cycle.

15. The combined cycle engine of claim 1, in which the turbine in the gas turbine cycle is configured to drive the compressor and one or more further loads selected from:
the fuel pump;
an electric machine;
an air compressor; and
the same load as the expander in the fuel expansion cycle.

16. The combined cycle engine of claim 1, in which the turbine in the gas turbine cycle is configured to drive a fan or a propeller.

17. The combined cycle engine of claim 16, in which the turbine in the gas turbine cycle is configured to drive the fan or the propeller via a reduction gearbox.

18. The combined cycle engine of claim 17, in which the reduction gearbox is an epicyclic reduction gearbox.

19. A combined cycle engine formed of a gas turbine cycle coupled with a fuel expansion cycle in which fuel for the gas turbine cycle is the working fluid of the fuel expansion cycle, wherein:
the fuel expansion cycle comprises, in flow series, a fuel pump for pumping a cryogenic fuel for the gas turbine cycle, a first heat exchanger for heating the fuel, an expander to recover power by expansion of the fuel and to thereby drive a load, and a second heat exchanger to reheat the fuel;
the gas turbine cycle comprises, in flow series, a compressor, a combustor for combustion of reheated fuel delivered from the second heat exchanger, and a turbine configured to drive the compressor;

the first heat exchanger and the second heat exchanger are stationed downstream of the combustor and are configured to transfer heat from combustion products of the gas turbine cycle to the fuel in the fuel expansion cycle;

the fuel expansion cycle further comprises a second expander stationed between the second heat exchanger and the combustor of the gas turbine cycle and a third heat exchanger to reheat the fuel stationed between the second expander and the combustor of the gas turbine cycle;

the fuel is heated to a first temperature in the first heat exchanger;

the fuel is reheated to a second temperature in the second heat exchanger;

the fuel is reheated to a third temperature in the third heat exchanger; and the first temperature, the second temperature, and the third temperature are the same temperature.

20. A combined cycle engine formed of a gas turbine cycle coupled with a fuel expansion cycle in which fuel for the gas turbine cycle is the working fluid of the fuel expansion cycle, wherein:
the fuel expansion cycle comprises, in flow series, a fuel pump for pumping a cryogenic fuel for the gas turbine cycle, a first heat exchanger for heating the fuel, an expander to recover power by expansion of the fuel and to thereby drive a load, and a second heat exchanger to reheat the fuel;

the gas turbine cycle comprises, in flow series, a compressor, a combustor for combustion of reheated fuel delivered from the second heat exchanger, and a turbine configured to drive the compressor; and the first heat exchanger and the second heat exchanger are stationed downstream of the combustor and are configured to transfer heat from combustion products of the gas turbine cycle to the fuel in the fuel expansion cycle; and further comprising a fuel pre-heater stationed between the fuel pump and the first heat exchanger, the fuel pre-heater comprising a burner configured to burn a quantity of said fuel to release heat for heating fuel pumped by the fuel pump.

* * * * *